(12) United States Patent
Han et al.

(10) Patent No.: US 12,167,425 B2
(45) Date of Patent: Dec. 10, 2024

(54) METHOD AND APPARATUS FOR ADDING SECONDARY NODE FOR UAV

(71) Applicant: LENOVO (BEIJING) LIMITED, Beijing (CN)

(72) Inventors: Jing Han, Beijing (CN); Lianhai Wu, Beijing (CN); Haiming Wang, Beijing (CN); Jie Shi, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 340 days.

(21) Appl. No.: 17/637,289

(22) PCT Filed: Aug. 23, 2019

(86) PCT No.: PCT/CN2019/102339
§ 371 (c)(1),
(2) Date: Feb. 22, 2022

(87) PCT Pub. No.: WO2021/035438
PCT Pub. Date: Mar. 4, 2021

(65) Prior Publication Data
US 2022/0287026 A1   Sep. 8, 2022

(51) Int. Cl.
*H04W 72/51* (2023.01)
*H04W 4/44* (2018.01)
*H04W 24/10* (2009.01)
*H04W 72/044* (2023.01)

(52) U.S. Cl.
CPC ............ *H04W 72/51* (2023.01); *H04W 4/44* (2018.02); *H04W 24/10* (2013.01); *H04W 72/046* (2013.01)

(58) Field of Classification Search
CPC ....... H04W 72/51; H04W 4/44; H04W 24/10; H04W 72/046; H04W 28/26
See application file for complete search history.

(56) References Cited

U.S. PATENT DOCUMENTS

2019/0098520 A1*  3/2019  Kim .................. H04W 76/27
2021/0006328 A1*  1/2021  Kim .................. H04W 72/23

FOREIGN PATENT DOCUMENTS

| EP | 3419197 A1 | 12/2018 |
| WO | 2018017840 A1 | 1/2018 |
| WO | 2019061105 A1 | 4/2019 |

OTHER PUBLICATIONS

International Searching Authority, "Written Opinion of the International Searching Authority," PCT/CN2019/102339, May 18, 2020, pp. 1-4.

* cited by examiner

*Primary Examiner* — Kabir A Timory
(74) *Attorney, Agent, or Firm* — Kunzler Bean & Adamson (57) ABSTRACT

Embodiments of the present disclosure relate to a method and apparatus for adding secondary node (SN) for an unmanned aerial vehicle (UAV). According to an embodiment of the present disclosure, a method can include: receiving location information of an UAV severed by a master node (MN); and transmitting an air beam preparation request for preparing an air beam for the UAV to a first set of candidate SNs with the location information of the UAV, wherein each of the first set of candidate SNs is connected to the MN via a network interface. Embodiments of the present disclosure can meet high QoS requirements in UAV use cases in NR.

19 Claims, 8 Drawing Sheets

[[# METHOD AND APPARATUS FOR ADDING SECONDARY NODE FOR UAV

TECHNICAL FIELD

Embodiments of the present disclosure generally relate to wireless communication technology, especially to a method and an apparatus for adding a secondary node (SN) for an unmanned aerial vehicle (UAV).

BACKGROUND

In recent years, aerial vehicles, such as unmanned aerial vehicles (UAVs) or drones are becoming more and more popular. For example, more and more UAVs are commercially used in package delivery, search-and-rescue, monitoring of critical infrastructure, wildlife conservation, flying cameras, and surveillance. 3rd generation partnership project (3GPP) observes this trend and is interested in introducing aerial vehicles, such as UAVs, into the wireless network like user equipment (UE), i.e., aerial UEs. Consequently, a new study item (SI) "Study on enhanced LTE Support for Aerial Vehicles" was approved by technical specification group (TSG) radio access network (RAN) #75 meeting.

In long term evolution (LTE) Rel-15, a UAV based LTE was studied in RP-171020 and a follow-up work item description (WID) in RP-181310 was finished in RAN2.

In 3GPP 5G new radio (NR), additional study on NR UAV applications is required to address emerging use cases. Compared with conventional uses, these emerging use cases may require higher upstream data throughput, lower end to end latency and higher reliability for communication link. However, such requirements cannot be met by LTE based solutions.

Therefore, the industry desires an improved technology to meet high quality of service (QoS) requirements in UAV use cases in NR.

SUMMARY OF THE APPLICATION

One objective of embodiments of the present disclosure is to provide a technical solution for SN addition for UAV.

According to an embodiment of the present disclosure, a method may include: receiving location information of a UAV severed by a MN; and transmitting an air beam preparation request for preparing an air beam for the UAV to a first set of candidate SNs with the location information of the UAV, wherein each of the first set of candidate SNs is connected to the MN via a network interface.

In an embodiment of the present disclosure, the method may further include: receiving flight path plan information of the UAV, and transmitting the flight path plan information of the UAV to the first set of candidate SNs.

In another embodiment of the present disclosure, transmitting the air beam preparation request may include: transmitting time range information regarding time to start the air beam and to cancel the air beam to the first set of candidate SNs.

In yet another embodiment of the present disclosure, transmitting the air beam preparation request includes: transmitting air beam preparation indication to the first of candidate SNs, indicating that each of the first set of candidate SNs should prepare the air beam or should determine whether to prepare the air beam by itself at least based on the location information of the UAV.

According to yet another embodiment of the present disclosure, a method may include: receiving an air beam preparation request for preparing an air beam for a UAV with location information of the UAV. In response to the air beam preparation request, preparing the air beam for the UAV or determining whether to prepare the air beam for the UAV at least based on the location information of the UAV.

In an embodiment of the present disclosure, in the case that the air beam for the UAV being prepared, the method may further include: transmitting an air beam preparation complete message.

According to another embodiment of the present disclosure, an apparatus may include: at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement a method according to an embodiment of the present disclosure with the at least one receiver, the at least one transmitter and the at least one processor.

Embodiments of the present disclosure provide a technical solution for providing a technical solution for adding SN for UAV. Accordingly, embodiments of the present disclosure can meet high QoS requirements in UAV use cases in NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G. Persons skilled in the art know very well that, with the development of network architecture and new service scenarios, the embodiments in the present disclosure are also applicable to similar technical problems.

Multi-radio dual connectivity (MR-DC) is a generalization of the intra evolved universal terrestrial radio access (E-UTRA) dual connectivity (DC) described in TS 36.300. In an MR-DC scenario, a UE may be configured to utilize resources provided by two different serving nodes connected via non-ideal backhaul, wherein one node provides NR access and the other node provides either E-UTRA access or NR access. The two nodes can be connected via a network interface such as an X2 interface or Xn interface, and each node can be an eNB or gNB etc., which has the capability of providing wireless access for a UE. Moreover, one node can act as a master node (MN), while the other can act as a secondary node (SN), wherein at least the MN can be connected to the core network (CN) via a network interface such as S1 interface or next generation (NG) interface. According to some embodiments of the present disclosure, an MN can be a master eNB in E-UTRA-NR dual connectivity (EN-DC), a master ng-eNB in NG-RAN E-UTRA-NR dual connectivity (NGEN-DC) or a master gNB in NR-E-UTRA dual connectivity (NE-DC). Similarly, an SN can be a secondary en-gNB in EN-DC, a secondary ng-eNB in NE-DC or a secondary gNB in NGEN-DC.

Figure 1:
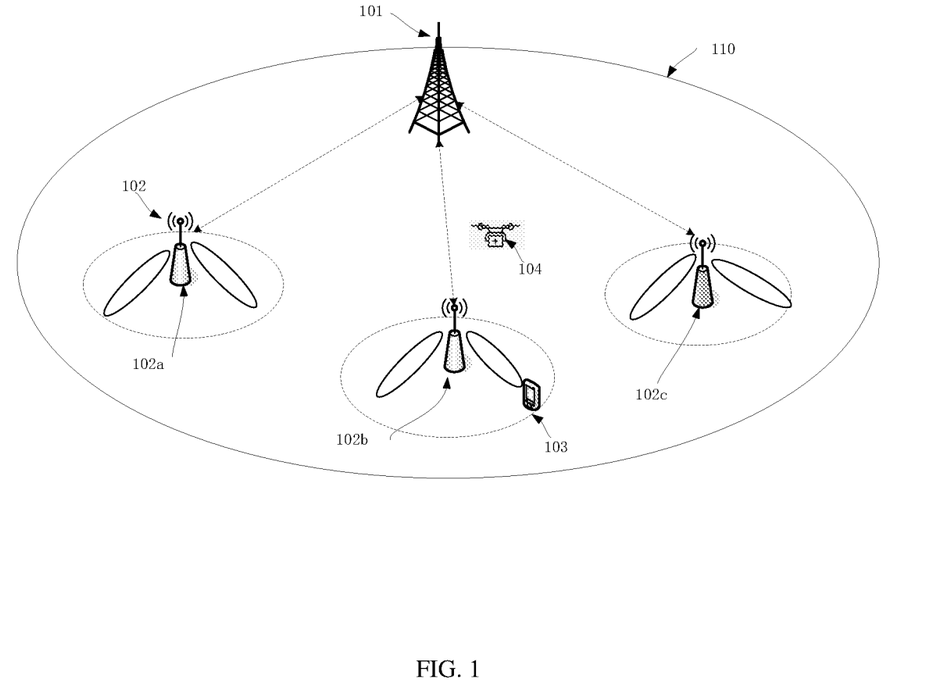
FIG. 1 is a schematic diagram illustrating an exemplary MR-DC scenario according to an embodiment of the present disclosure.

For example, FIG. 1 is a schematic diagram illustrating an exemplary MR-DC scenario according to an embodiment of the present disclosure. For simplification and clearness, the exemplary scenario only shows one eNB 101, three gNBs 102, one ground UE 103 and one UAV 104. Persons skilled in the art should understand that the present disclosure can also provide corresponding embodiments adaptive to other MT-DC scenarios.

As shown in FIG. 1, the eNB 101 defines a cell 110, and can provide a seamless widely coverage for a UE in the cell 110, for example the ground UE 103 and UAV 104. The three gNBs 102, e.g., a first gNB 102a, second gNB 102b, and third gNB 102c are within the coverage of the eNB 101. Each of the gNB 102 can provide a hot spot coverage for improving system capacity. The ground UE 103 may be a computing device, a portable wireless communication device, a wearable device, a vehicle, or the like.

In response to a high quality requirement from a ground UE, for example the ground UE 103 in FIG. 1, the legacy MR-DC specification has provided a method for adding an SN for a ground UE so that the ground UE can be configured to utilize resources provided by an MN, e.g., eNB 101 and an SN, e.g., one of the three gNBs 102.

For example, according to an embodiment of the present disclosure, the ground UE 103 may firstly access the cell 110 and is serviced by the eNB 101, which may act as a MN for the ground UE 103 in the MR-DC scenario. When the ground 103 moves to the boundary of the cell 110, the quality of the link between the ground UE 103 and the eNB 101 may decrease and cannot satisfy the service of quality (QoS) of the ground UE 103. The MN, i.e., the eNB in this embodiment may determine to add a secondary node for servicing the ground UE 103 through a SN addition procedure as shown in FIG. 2.

Figure 2:
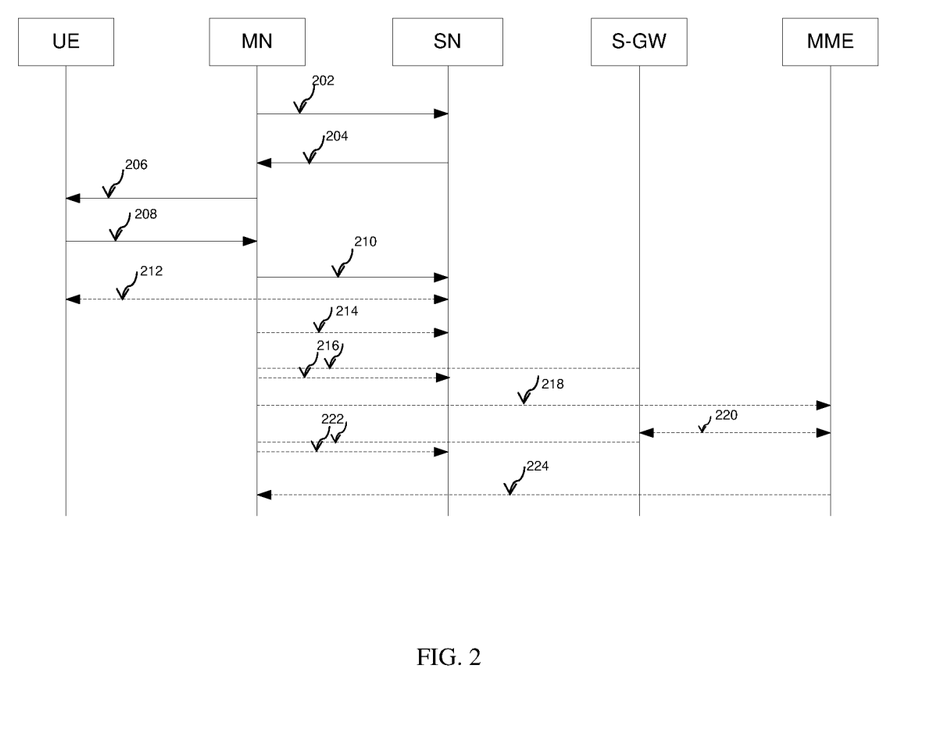
FIG. 2 is a flow chart illustrating a method for adding an SN for a ground UE according to the legacy MR-DC specification.

Specifically, FIG. 2 is a flow chart illustrating a method for adding an SN for a ground UE according to the legacy MR-DC specification.

As shown in FIG. 2, in step 202, the MN, e.g., the eNB 101 may transmit an SgNB Addition Request message to an SN, e.g., the second gNB 102b for adding the SN to the ground UE 103. For example, the SgNB Addition Request message may request the SN to allocate resources for a specific evolved radio access bearer (E-RAB).

In step 204, in the case that the radio resource management (RRM) entity in the SN, e.g., the second gNB 102b is able to admit the resource request, the SN may transmit an SgNB Addition Request Acknowledge message to the MN, e.g., the eNB 101. For example, the SgNB Addition Request Acknowledge message may include the allocated resources for the specific E-RAB.

In step 206, the MN, e.g., the eNB 101 may send an RRCConnectionReconfiguration message including an NR radio resource control (RRC) configuration message to the ground UE, e.g., the ground UE 103.

In step 208, the ground UE 103 may apply the new configuration and reply the MN, e.g., the eNB 101, with an RRCConnectionReconfigurationComplete message, including a NR RRC response message, if needed.

In step 210, the MN, e.g., the eNB 101 may receive from the NR RRC response message from the ground UE 103 and inform the SN, e.g., the second gNB 102b that the ground UE 103 has completed the reconfiguration procedure successfully via an SgNB ReconfigurationComplete message, including the encoded NR RRC response message.

In step 212, in the case the ground UE 103 is configured with bearers requiring secondary cell group (SCG) radio resources, the ground UE 103 may perform synchronization towards the primary cell of SCG (i.e., a PSCell) of the SN.

In step 214, in case of SN terminated bearers using RLC AM, the MN may send an SN Status Transfer message to the SN.

In step 216, the MN, e.g., the second gNB 102b may perform data forwarding to the SN, e.g., the second gNB 102b. For example, the MN receives data from the serving gateway (S-GW), and then forwards the received data to the SN.

In steps 218-224, for SN terminated bearers, the update of the user plane (UP) path towards the evolved packet core internet (EPC) is performed. For example, in step 218, the MN may transmit an E-RAB modification indication to mobility management entity (MME). In step 220, the MME may transmit a bearer modification message to the S-GW. In step 222, the S-GW may transmit an end marker packet to the MN and the MN may forward the end marker packet to the SN. In step 224, the MME may transmit an E-RAB modification confirm message to the MN.

In NR, the UAV may also require high upstream data throughput, lower end to end latency and higher reliability for communication link. For example, Table 7.1.1-1 defined in TR 22.829 specified by the 3GPP illustrates consolidated key performance indicators (KPIs) for the UAV for different uses cases.

Referring to Table 7.1.1-1, the required stable data rate for uplink transmission of the UAV should be up to 120 Mbps to support multiple-stream high definition (HD) video transmissions for monitoring and surveillance services of the UAV.

TABLE 7.1.1-1

Consolidated KPIs for UAV

| | Services | Uplink data rate(UAV to Net) Note 7 | Service control data rate(Net to UAV) | Data latency | Control latency | Positioning accuracy | Altitude | Higher accuracy location latency | Region |
|---|---|---|---|---|---|---|---|---|---|
| 1 | 8K video live broadcast | 100 Mbps | 600 Kbps | 200 ms | 20 ms | 0.5 m | <100 m | — | Urban, scenic area |
| 2 | Laser mapping/ HD patrol | 120 Mbps Note 1 | 300 Kbps | 200 ms | 20 ms | 0.5 m | 30-300 m | — | Urban, rural area, scenic area |
| 3 | 4*4K AI surveillance | 120 Mbps | 50 Mbps | 200 ms | 40 ms Note 2 | 0.1 m | <200 m | 10 ms Note 3 | Urban, rural area |

However, the high QoS requirements on the communication link for a UAV cannot be met by the LTE based solutions. To satisfy the above QoS requirements, one solution is to add an SN for a UAV like that performed to the ground UE. However, the procedure for adding an SN in legacy MR-DC specification as illustrated in FIG. 2 cannot be directly used for the UAV at least for the following reasons.

First, a NR cell, e.g., a gNB usually has a very narrow beam. Normally, a gNB may only provide coverage with a direction for ground UEs due to UAVs being rare. That is, the antenna direction of a NR cell, e.g., a gNB is usually down-tilt for serving ground UEs, which results in that the UAVs in the air are hardly been covered by the side lobe of the narrow beam. Meanwhile, for a gNB, always having an air beam for UAVs is wasteful.

Second, a NR cell, e.g., a gNB may not support UAV feature at all. Specifically, wireless network operators may not upgrade all gNBs with UAV feature for saving cost, and the NR cell may does not support system information for UAV, Layer 1 and Layer 2 measurement and measurement report trigger based on multi-cell, reporting UAV features, e.g., flight path plan, UAV subscription, power control enhancement etc. In this case, even if a UAV can be covered by a side lobe of the NR cell, the UAV cannot access the NR cell, let alone measuring the NR cell.

Given the above, compared with the legacy SN addition scheme, the SN addition scheme for a UAV has to select or determine a node as the SN and require the SN to prepare at least an air beam for the UAV before finally adding the SN for the UAV.

At least for the above technical problems, embodiments of the present application propose a novel method for adding an SN for a UAV, which can at least meet high QoS requirements in UAV use cases in NR.

Figure 3:
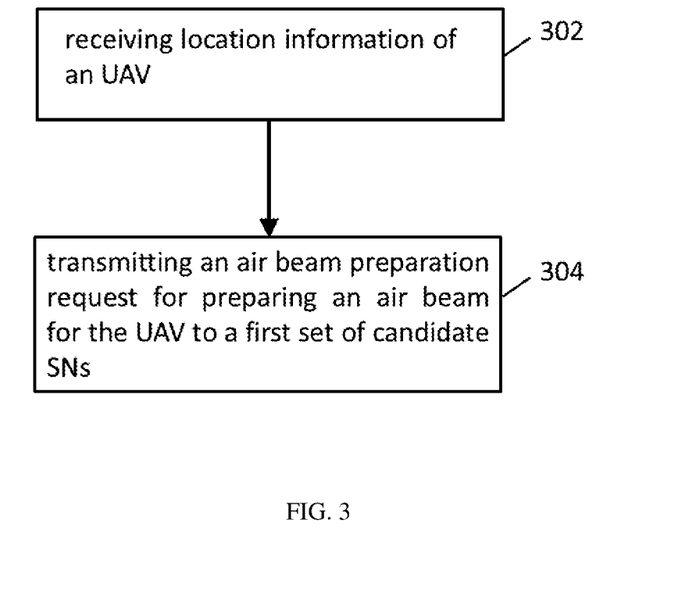
FIG. 3 is a flow chart illustrating a method for adding an SN for a UAV according to an embodiment of the present disclosure.

FIG. 3 is a flow chart illustrating a method for adding SN for UAV according to an embodiment of the present disclosure. The method may be managed by a MN or core network (CN) to which the MN is connected, and can be adaptive to the MR-DC scenario shown in FIG. 1. The MN may refer to the node to which the UAV firstly accessed and may be an eNB or a gNB. For example, the MN may be the eNB 101 as shown in FIG. 1. The CN may at least include one or more of: serving gateway (S-GW), mobility management entity (MME), access and mobility management Function (AMF), and user plane function (UPF) etc.

As shown in FIG. 3, in step 302, location information of a UAV, which needs a SN, can be received. According to some embodiments of the present disclosure, a UAV e.g., the UAV 104 in FIG. 1, will report its location information to the MN, e.g., the eNB101 in FIG. 1 which the UAV has accessed. The location information may include at least one of the followings: longitude of the UAV, latitude of the UAV, altitude of the UAV, height above the sea of the UAV, height relative to ground of the UAV, and speed of the UAV etc. According to some embodiments of the present disclosure, the UAV may also report its flight path plan information to the MN. Accordingly, the MN may also receive flight path plan information of the UAV, which may indicate the flight path plan for specific time or time range of the UAV.

In the case that the method for adding SN for UAV is managed by the CN, the CN can receive the information of the UAV, e.g., location information of the UAV and the flight path plan information (if necessary) of the UAV from the MN. The MN may transmit the location information of the UAV and the flight path plan information of the UAV (if necessary) received from the UAV to the CN via a network interface such as S1 interface or NG interface between the CN and MN.

In step 304, an air beam preparation request for preparing an air beam for the UAV, e.g., UAV 104 in FIG. 1 can be transmitted to a first set of candidate SNs, e.g., the three gNBs 102 with the location information of the UAV, by the MN or CN. The air beam may be a beam directed to air to provide NR access for the UAV flying in the air. Each of the first set of candidate SNs can be connected to the MN via a network interface, such as an X2 interface or an Xn interface. In the case that the CN transmits the air beam preparation request, each of the first set of candidate SNs can be connected to the CN via a network interface such as S1 interface or NG interface.

According to some embodiments of the present disclosure, the first set of candidate SNs may be selected from nodes connected to the MN through a network interface such as an X2 interface or Xn interface by the MN or CN at least based on the location information of the UAV. For example, after receiving the location information of the UAV, the MN or CN may obtain the locations of all nodes connected to the MN from a location server, and select at least one proper node. e.g., at least one node near the UAV as the first set of candidate SNs. In the case that the MN or CN, which transmits the air beam preparation request, has received the flight path plan information, the MN or CN may select the nodes on the planned flight path of the UAV as the first set of candidate SNs. Then, the MN or CN may transmit the air beam preparation request to the first set of candidate SNs.

According to some embodiments of the present disclosure, the first set of candidate SNs may include all the nodes connected to the MN via the network interface such as an X2 interface or an Xn interface.

According to some embodiments of the present disclosure, the air beam preparation request may be transmitted also with the flight path plan information of the UAV.

According to some embodiments of the present disclosure, the air beam preparation request may be transmitted also with time range information regarding time to start the air beam and to cancel the air beam. In an embodiment of the present disclosure, the time range information may include a start time and a time length for the requested air beam. The start time and the time length may be an absolute time value. In this case, the SN is required to start the air beam together with a timer at the start time, and set a length of the timer to be the time length. The SN may keep the air beam before the timer expires, and cancel the air beam when the timer expires. In another embodiment of the disclosure, the time range information may include a start time and an end time. The start time and the end time may be an absolute time value. In this case, the SN may start the air beam together with a timer at the start time, and set a length of the timer to be a difference of the end time and the start time. The SN may keep the air beam before the timer expires, and cancel the air beam when the timer expires.

According to some embodiments of the present disclosure, the air beam preparation request may also be transmitted with an air beam preparation indication indicating that each of the first set of candidate SNs should prepare the air beam or should determine whether to prepare the air beam by itself at least based on the location information of the UAV. In the case that the air beam preparation indication indicates the air beam should be prepared, it means the MN or CN has selected or determine the node to be added as the SN during selecting the first set of candidate SNs. The candidate SN needs to prepare the air beam as required. In the case that the air beam preparation indication indicates whether to prepare the air beam should be determined by the candidate SN itself, it means the MN or CN has not selected or determine the node to be added as the SN, for example, the MN or CN selecting all nodes connected to the MN as the candidate nodes. The candidate SN needs to prepare the air beam as required based on its own determination.

For example, the air beam preparation indication may be 1-bit information with a value "0" or "1". Specifically, "0" may indicate that each of the first set of candidate SNs should prepare the air beam. "1" may indicate that each of the first set of candidate SNs should determine whether to prepare the air beam by itself at least based on the location information of the UAV. In another embodiment, "1" may indicate that each of the first set of candidate SNs should prepare the air beam. "0" may indicate that each of the first set of candidate SNs should determine whether to prepare the air beam by itself at least based on the location information of the UAV.

The MN or CN may receive an air beam preparation complete message from each of a second set of candidate SNs that has prepared the air beam for the UAV, wherein the second set of candidate SNs is a subset of the first set of candidate SNs. Specifically, in the case that the air beam preparation request indicates that each of the first set of candidate SNs should prepare the air beam, the second set of candidate SNs may be the same as the first set of candidate SNs. In the case that the air beam preparation request indicates that each of the first set of candidate SNs should determine whether to prepare the air beam by itself, the candidate SN that determines not to prepare the air beam will not transmit the air beam preparation complete message. Accordingly, the second set of candidate SNs may be the same as or smaller than the first set of candidate SNs.

According to some embodiments of the present disclosure, the MN or CN may trigger a timer for receiving the air beam preparation complete message. When the timer expires, for the candidate SN whose air beam preparation complete message has not been received, the MN or CN may determine that the corresponding SN does not prepare the air beam.

According to some embodiments of the present disclosure, the CN may transmit the air beam preparation request, and thus the CN may receive the air beam preparation complete message from the second set of candidate SNs. After receiving the air beam preparation complete message from the second set of candidate SNs, the CN may transmit a list of the second set of candidate SNs that have prepared the air beam for the UAV to the MN.

After receiving the air beam preparation complete message from the second set of candidate SNs or receiving the list of the second set of candidate SNs, the MN may transmit measurement configuration information associated with the second set of candidate SNs to the UAV.

In an embodiment of the present disclosure, the measurement configuration information may include a measurement object for each candidate SN of the second set of candidate SNs. The measurement object may include at least one of the following parameters: PhysCellId, ssbFrequency, ssbSubcarrierSpacing, smtc1, smtc2, referenceSignalConfig and other parameters which are needed for performing measurement by the UAV. The parameter PhysCellId indicates physical cell identity of a cell in the cell list. The parameter ssbFrequency indicates the frequency of the synchronization signal (SS) associated to the MeasObjectNR. The parameter ssbSubcarrierSpacing indicates the subcarrier spacing of synchronization signal block (SSB). The parameter smtc1 indicates primary measurement timing configuration, while parameter smtc2 indicates secondary measurement timing configuration for SS corresponding to the MeasObjectNR. The parameter referenceSignalConfig indicates a reference signal (RS) configuration for SS/physical broadcast channel (PBCH) block and channel state information reference signal (CSI-RS).

In another embodiment of the present disclosure, the measurement configuration information may also include measurement report trigger information associated with each measurement object. The measurement report trigger information may indicate a trigger condition to send a measurement report by the UAV. The measurement report may include measurement results, for example, measurement result for the measurement object. In an embodiment of the present disclosure, the trigger condition may be a period. That is, the measurement report trigger information may indicate a period and the UAV should transmit the measurement report periodically, and then the UAV may transmit the measurement report periodically. In another embodiment of the present disclosure, the trigger condition may be an event. That is, the measurement report trigger information may indicate that the UAV should transmit the measurement report based on an event, for example, the measurement report trigger information may indicate that if the measurement result of a candidate SN is above a threshold for a period of time, and the UAV should transmit the measurement report of the candidate SN to the MN. Persons skilled in the art can understand that the above measurement report trigger information are only for illustrated purpose, other methods for trigger the measurement report can also be applied in the present disclosure.

In yet another embodiment of the present disclosure, for a measurement object, the measurement configuration information may also include timer information associated with the measurement object. The timer information has a timer length which is used for the UAV to transmit the measurement report. After receiving the timer information, the UAV may set a timer for the measurement object associated with the corresponding candidate SN and stop the timer when the trigger condition indicated by measurement report trigger information is fulfilled. Otherwise, when the timer expires, the UAV may transmit the measurement report associated with the corresponding candidate SN to the MN even though the trigger condition indicated by measurement report trigger information is not fulfilled.

Consequently, not measurement results for all of the second set of candidate SNs can fulfil the trigger condition. That is, not all measurement reports of the second set of candidate SNs can be transmitted to MN. Therefore, after transmitting the measurement configuration information associated with the second set of candidate SNs to the UAV, the MN may receive measurement reports associated with a third set of candidate SNs from the UAV, wherein the third set of SNs is a subset of the second set of candidate SNs. Then, the MN may select at least one of the third set of candidate SNs as the SN for serving the UAV with the MN. The selection may be performed based on the measurement result included in the measurement reports.

The at least one selected candidate SN may be finally added as the SN for serving the UAV through a final SN addition procedure, which can be the same as that for the ground UE as shown in FIG. 2. Persons skilled in the art can understand that the SN addition procedure as shown in FIG. 2 is only for illustrated purpose, other known SN addition procedures can also be applied in the present disclosure.

Except for the at least one selected candidate SN of the third set of candidate SNs, the candidate SNs of the second set of candidate SNs which are not selected as the SN also have prepared the air beam. Specifically, the candidate SNs of the second set of candidate SNs which are not selected as the SN may include the candidate SNs whose measurement reports are not received at the MN and whose measurement reports are received at the MN but are not selected as the SN.

For the candidate SNs of the second set of candidate SNs which are not selected as the SN, in an embodiment of the present disclosure, the MN may transmit an air beam cancellation indication to indicate the candidate SN to cancel the air beam prepared for the UAV. In another embodiment of the present disclosure, the candidate SNs of the second set of candidate SNs which are not selected as the SN may have a timer for keep the air beam, when the timer expires, these candidate SNs may cancel the prepared air beam without the air beam cancellation indication from the MN.

Figure 4:
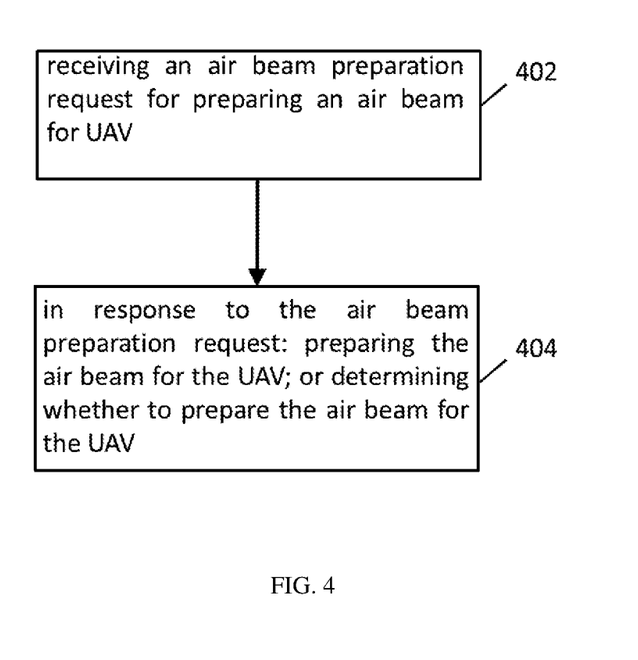
FIG. 4 is a flow chart illustrating a method for adding an SN for a UAV according to another embodiment of the present disclosure.

FIG. 4 is a flow chart illustrating a method for adding SN for UAV according to another embodiment of the present disclosure. The method may be performed by a candidate SN connected to the MN via a network interface such as X2 or Xn interface, and can be adaptive to the MR-DC scenario shown in FIG. 1. The MN may refer to the node to which the UAV firstly accessed, which may be an eNB or a gNB. For example, the MN may be the eNB 101 as shown in FIG. 1. The candidate SN may be an eNB or a gNB. For example, the SN may be the gNB 102a, the gNB 102b, or the gNB 102c as shown in FIG. 1. The MN may be connected to a CN via a network interface such as S1 interface or NG interface. In the case that the candidate SN receives an air beam preparation request from the CN, the candidate SN may also be connected to the CN via a network interface such as S1 interface or NG interface.

As shown in FIG. 4, in step 402, the candidate SN, for example, gNB 102a, gNB 102b, or gNB 102c may receive an air beam preparation request for preparing an air beam for an UAV with location information of the UAV from the MN or the CN. The air beam may be a beam directed to air to provide NR access for the UAV flying in the air. The location information may include at least one of the following: longitude of the UAV, latitude of the UAV, altitude of the UAV, height above the sea of the UAV, height relative to ground of the UAV, and speed of the UAV etc.

According to some embodiments of the present disclosure, the air beam preparation request may be received also with the flight path plan information of the UAV, which may indicate the flight path plan for specific time or time range of the UAV.

According to some embodiments of the present disclosure, the air beam preparation request may be received also with time range information regarding time to start the air beam and to cancel the air beam. In an embodiment of the present disclosure, the time range information may include a start time and a time length for the requested air beam. The start time and the time length may be an absolute time. In another embodiment of the disclosure, the time range information may include a start time and an end time. The start time and the end time may be an absolute time.

According to some embodiments of the present disclosure, the air beam preparation request may be received also with an air beam preparation indication indicating that the candidate SN should prepare the air beam or should determine whether to prepare the air beam by itself at least based on the location information of the UAV. For example, the air beam preparation indication may be 1-bit information with a value "0" or "1". Specifically, "0" may indicate that the candidate SN should prepare the air beam. "1" may indicate that the candidate SN should determine whether to prepare the air beam by itself at least based on the location information of the UAV. In another embodiment, "1" may indicate that the candidate SN should prepare the air beam. "0" may indicate that the candidate SN should determine whether to prepare the air beam by itself at least based on the location information of the UAV.

In response to the air beam preparation request, at step 404, the candidate SN may prepare the air beam for the UAV or determine whether to prepare the air beam for the UAV at least based on the location information of the UAV.

Specifically, according to some embodiments of the present disclosure, in the case that the air beam preparation request indicates that the candidate SN should prepare the air beam for the UAV, the candidate SN can prepare the air beam for the UAV as required, for example based on the location information and the flight path plan of the UAV.

According to according to some embodiments of the present disclosure, in the case that the air beam preparation request indicates that the candidate SN should determine whether to prepare the air beam for the UAV, the candidate SN can determine whether to prepare the air beam for the UAV at least based on the location information of the UAV. For example, the candidate SN may determine whether to prepare the air beam based on the location information of the UAV, the flight path plan information of the UAV (if necessary), and the location of the candidate SN itself. For example, in the case that the candidate SN is near the UAV or is on the planned flight path of the UAV, the candidate SN may determine to prepare the air beam for the UAV. Otherwise, the candidate SN may determine not to prepare the air beam for the UAV. In the case that the candidate SN determines not to prepare the air beam for the UAV, it may transmit a message to the MN or the CN from which the air beam preparation request is received to indicate that the air beam is not prepared.

Regardless of whether the candidate SN is required to prepare the air beam by the air beam preparation request or the candidate SN itself determines to prepare the air beam, the candidate SN may prepare the air beam to serve the UAV at least based on the location information of the UAV and the flight path plan information of the UAV (if necessary). The following embodiments may illustrate how and when to start the air beam.

In an embodiment of the present disclosure, the air beam preparation request may not include the time range information. The candidate SN may prepare the air beam to serve the UAV immediately after it receives the air beam preparation request or immediately after it determines to prepare the air beam.

In another embodiment of the present disclosure, in the case that the air beam preparation request includes the time range information and the time range information includes a start time and a time length, the SN may start the air beam together with a timer at the start time, and set a length of the timer to be the time length. The SN may keep the air beam before the timer expires, and cancel the air beam when the timer expires.

In yet another embodiment of the present disclosure, in the case that the air beam preparation request includes the time range information and the time range information includes a start time and an end time, the SN may start the air beam together with a timer at the start time, and set a length of the timer to be a difference of the end time and the start time. The SN may keep the air beam before the timer expires, and cancel the air beam when the timer expires.

In yet another embodiment of the present disclosure, in the case that the candidate SN already has a prepared air beam, which may be prepared for another UAV, the candidate SN may determine whether the prepared air beam can be reused for the UAV based on the location information of the UAV and the flight path plan information of the UAV (if necessary). In the case that the prepared air beam can be reused for the UAV, the candidate SN may restart a timer for the prepared air beam based on the air beam preparation request. For example, the candidate SN may restart the timer based on the start time in the time range information in the air beam preparation request, and reset the length of the timer based on the time length or end time in the air beam preparation request.

After preparing the air beam, the candidate SN may transmit an air beam preparation complete message to the MN or the CN from which the air beam preparation request is received to indicate that the candidate SN has prepared the air beam.

In the case that the candidate SN is selected to be the SN for serving the UAV, a final SN addition procedure, which is similar to the legacy SN addition scheme for the ground UE, can be performed to finally add the candidate SN as the SN for serving the UAV.

In the case that the candidate SN has prepared the air beam but is not selected to be the SN for serving the UAV, the candidate SN may receive an air beam cancellation indication to cancel the air beam prepared for the UAV. In the case that the candidate SN has set a timer for the prepared for the UAV based on the time range information in the air beam preparation request, the candidate SN may cancel the air beam when the timer expires.

Figure 5:
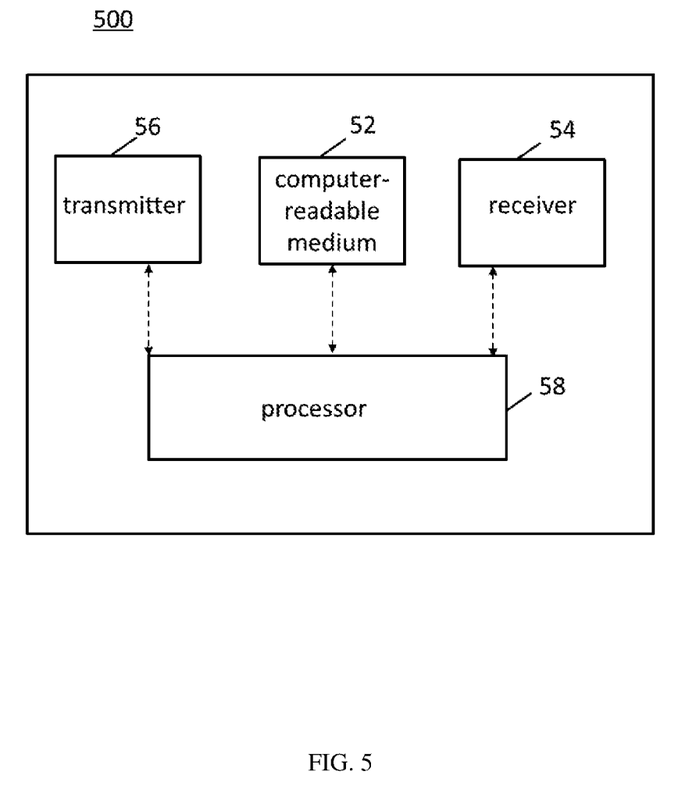
FIG. 5 illustrates a block diagram of an apparatus for adding an SN for a UAV according to an embodiment of the present disclosure.

FIG. 5 illustrates a block diagram of an apparatus 500 for adding an SN for a UAV according to an embodiment of the present disclosure. The apparatus 500 may be a MN, for example, the eNB 101 in FIG. 1 or a CN.

Referring to FIG. 5, the apparatus 500 may include at least one non-transitory computer-readable medium 52, at least one receiver 54, at least one transmitter 56, and at least one processor 58. In some embodiment of the present disclosure, at least one receiver 54 and at least one transmitter 56 and be integrated into at least one transceiver. The at least one non-transitory computer-readable medium 52 may have computer executable instructions stored therein. The at least one processor 58 may be coupled to the at least one non-transitory computer-readable medium 52, the at least one receiver 54 and the at least one transmitter 56. The computer executable instructions can be programmed to implement a method with the at least one receiver 54, the at least one transmitter 56 and the at least one processor 58. The method can be a method according to an embodiment of the present disclosure, for example, the method shown in FIG. 3.

Figure 6:
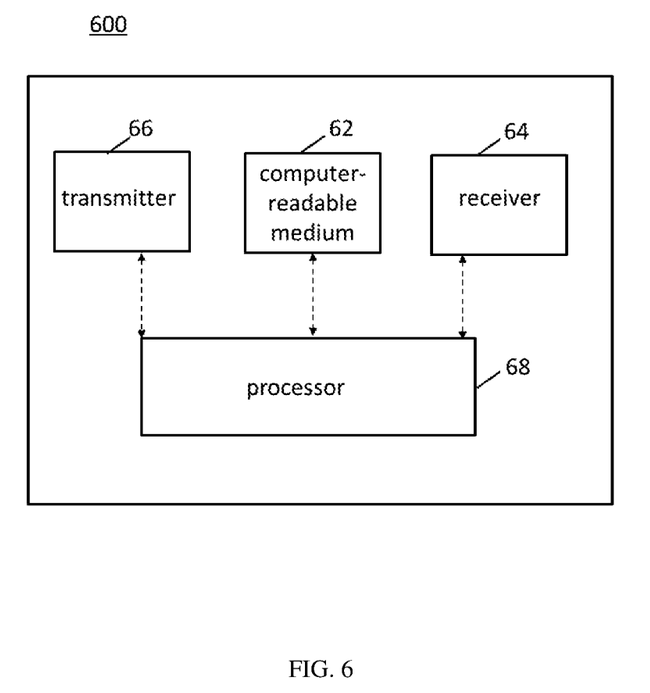
FIG. 6 illustrates a block diagram of an apparatus for adding an SN for a UAV according to another embodiment of the present disclosure.

FIG. 6 illustrates a block diagram of an apparatus 600 for adding an SN for a UAV according to another embodiment of the present disclosure. The apparatus 600 may be a candidate SN, for example, the first gNB 102a, the second gNB 102b, and/or the third gNB 102c in FIG. 1.

Referring to FIG. 6, the apparatus 600 may include at least one non-transitory computer-readable medium 62, at least one receiver 64, at least one transmitter 66, and at least one processor 68. In some embodiment of the present disclosure, at least one receiver 64 and at least one transmitter 66 and be integrated into at least one transceiver. The at least one non-transitory computer-readable medium 62 may have computer executable instructions stored therein. The at least one processor 68 may be coupled to the at least one non-transitory computer-readable medium 62, the at least one receiver 64 and the at least one transmitter 66. The computer executable instructions can be programmed to implement a method with the at least one receiver 62, the at least one transmitter 64 and the at least one processor 66. The method can be a method according to an embodiment of the present application, for example, the method shown in FIG. 4.

Figure 7:
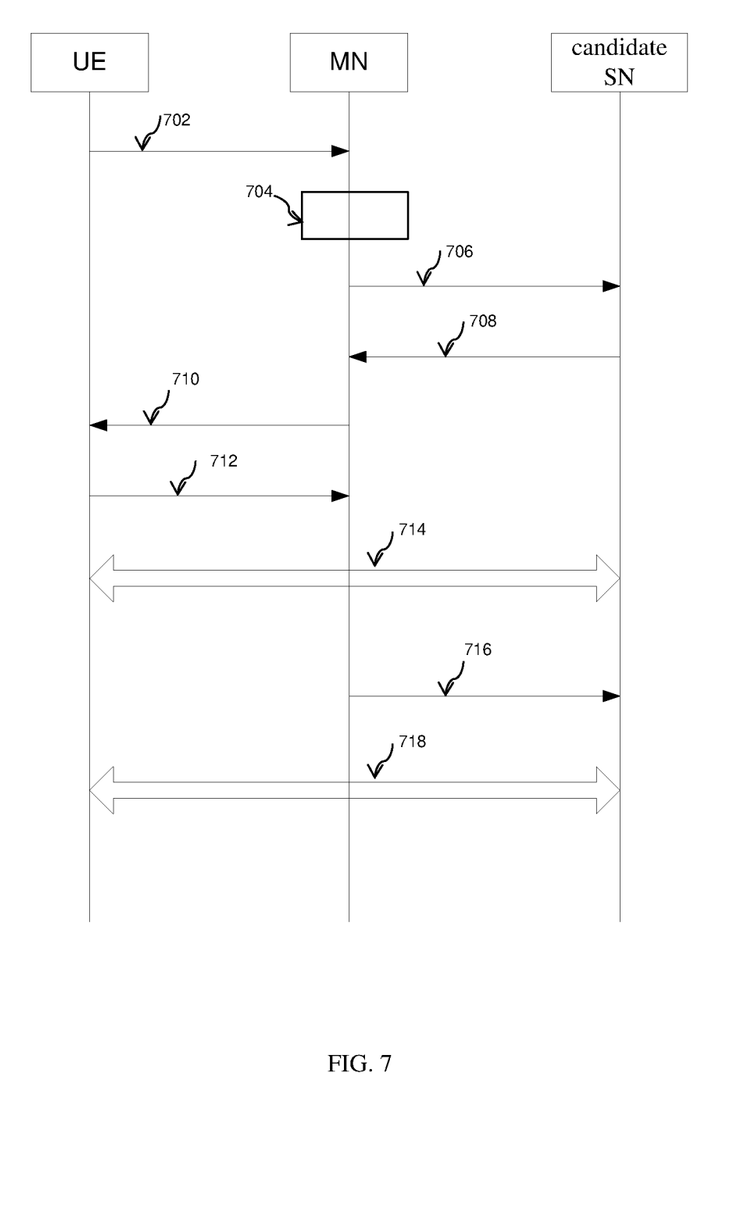
FIG. 7 is a flow chart illustrating a method for adding an SN for a UAV according to an embodiment of the present disclosure.

FIG. 7 is a flow chart illustrating a method for adding an SN for a UAV according to an embodiment of the present disclosure. The method illustrated in FIG. 7 may be used in the MR-DC scenario shown in FIG. 1.

As shown in FIG. 7, in step 702, the UAV, e.g., the UAV 104 may at least transmit its location information to an MN, e.g., the eNB 101 to which the UAV 104 firstly accessed. For example, besides the location information, the UAV 104 may also transmit its flight path plan information to the MN. The location information may include at least one of the following: longitude of the UAV, latitude of the UAV, altitude of the UAV, height above the sea of the UAV, height relative to ground of the UAV, and speed of the UAV etc. The flight path plan information may indicate the flight path plan for specific time or time range of the UAV.

After receiving the location information and flight path plan information of the UAV, at step 704, the MN may obtain the locations of all nodes connected to the MN via a network interface such as X2 or Xn interface from a location server, and select at least one proper node, e.g., at least one node near the UAV as a first set of candidate SNs based on the location information. In the case that the MN also receives the flight path plan information of the UAV, the MN may select the nodes on the planned flight path of the UAV.

After selecting the first set of candidate SNs, at step 706, the MN may transmit an air beam preparation request to the first set of candidate SNs. The air beam preparation request may indicate that each of the first of candidate SNs should prepare the air beam, which may be implemented by the air beam preparation indication stated above or by other known methods. The air beam preparation request may at least include the location information of the UAV. Except for the location information, the air beam preparation request may also include one or more of the following information: the flight path plan information of the UAV, the time range information regarding time to start the air beam and to cancel the air beam, and an air beam preparation indication indicating that each of the first set of candidate SNs should prepare the air beam as stated above. The time range information may include a start time and a time length, or include a start time and an end time.

After receiving the air beam preparation request, each of the candidate SNs may prepare the air beam based on the air beam preparation request.

Specifically, in the case that air beam preparation request does not include the time range information, the candidate SN may prepare the air beam to cover the UAV immediately after it receives the air beam preparation request. In the case that the air beam preparation request includes the time range information, the candidate SN may start the air beam together with a timer at the start time, set a length of the timer to be the time length or a difference of the end time and the start time, keep the air beam before the timer expires, and cancel the air beam when the timer expires. In the case that the candidate SN already has another air beam being prepared, the candidate SN may determine whether the prepared air beam can be reused for the UAV. In the case that the prepared air beam can be reused for the UAV, the candidate SN may restart a timer for the prepared air beam based on the air beam preparation request. For example, the candidate SN may restart the timer based on the start time in the time range information in the air beam preparation request, reset the length of the timer based on the time length or end time in the air beam preparation request.

According to some embodiments of the present disclosure, the first set of candidate SNs may include all nodes connected to the MN via the network interface such as an X2 interface or an Xn interface. In this case, the MN may not perform step 704, but directly transmit the air beam preparation request to all nodes at step 706 after receiving the location information and flight path plan information of the UAV. In this case, the air beam preparation request in step 706 may indicate that all nodes should determine whether to prepare the air beam for the UAV at least based on the location information of the UAV, which may be implemented by the air beam preparation indication stated above or by other known methods. In this case, all nodes may be referred to as the first set of candidate SNs.

Similarly, in this case, the air beam preparation request may at least include the location information of the UAV. Except for the location information, the air beam preparation request may also include one or more of the following information: the flight path plan information of the UAV, the time range information regarding time to start the air beam and to cancel the air beam, and an air beam preparation indication indicating that each of all nodes should determine whether to prepare the air beam for the UAV at least based on the location information of the UAV. The time range information may include a start time and a time length, or include a start time and an end time.

After receiving the air beam preparation request, the candidate SN may determine whether to prepare the air beam based on the location information of the UAV, the flight path plan information of the UAV (if necessary), and the location of the candidate SN itself. For example, in the case that the SN is near the UAV or is on flight path of UAV, the candidate SN may determine to prepare the air beam for the UAV. In the case that the candidate SN determines not to prepare the air beam for the UAV, at step 708, it may transmit a message to MN to indicate that the air beam is not prepared.

In the case that the candidate SN determines to prepare the air beam: in the case that air beam preparation request does not include the time range information, the candidate SN may prepare the air beam to cover the UAV immediately after it determines to prepared the air beam preparation request. In the case that the air beam preparation request includes the time range information, the candidate SN may start the air beam together with a timer at the start time, set a length of the timer to be the time length or a difference of the end time and the start time, keep the air beam before the timer expires, and cancel the air beam when the timer expires. In the case that the candidate SN already has another air beam being prepared, the candidate SN may determine whether the prepared air beam can be reused for the UAV. In the case that the prepared air beam can be reused for the UAV, the candidate SN may restart a timer for the prepared air beam based on the air beam preparation request. For example, the candidate SN may restart the timer based on the start time in the time range information in the air beam preparation request, reset the length of the timer based on the time length or end time in the air beam preparation request.

After preparing the air beam, at step 708, the candidate SN may transmit an air beam preparation complete message to MN to indicate that the candidate SN has prepared the air beam.

Accordingly, the MN may receive the air beam preparation complete message from each of a second set of candidate SNs that has prepared the air beam for the UAV, wherein the second set of candidate SNs is a subset of the first set of candidate SNs. Specifically, in the case that the air beam preparation request indicates that each of the first set of candidate SNs should prepare the air beam, the second set of candidate SNs may be the same as the first set of candidate SNs.

In the case that the air beam preparation request indicates that each of the first set of candidate SNs should determine whether to prepare the air beam by itself, the candidate SN that determines not to prepare the air beam will not transmit the air beam preparation complete message. Accordingly, the second set of candidate SNs may be a subset of the first set of candidate SNs. After receiving the air beam preparation complete message from the second set of candidate SNs, in step 710, the MN may transmit measurement configuration information associated with the second set of candidate SNs to the UAV. As stated above, the measurement configuration information may include a measurement object for each candidate SN of the second set of candidate SNs and measurement report trigger information associated with each measurement object. In addition, for a measurement object, the measurement configuration information may also include timer information associated with the measurement object. The timer information has a timer length which is used for the UAV to transmit the measurement report.

After receiving the measurement configuration information, the UAV may perform the measurements on the measurement objects, obtain the measurement results. In the case that the measurement results fulfil the trigger condition indicated by measurement report trigger information, in step 712, the UAV may transmit the corresponding measurement report including the measurement result.

In the case that the timer information is included in the measurement configuration information, after receiving the timer information, the UAV may set a timer for the measurement object associated with the corresponding candidate SN and stop the timer when the trigger condition indicated by measurement report trigger information is fulfilled. Otherwise, when the timer expires, in step 712, the UAV may transmit the measurement report associated with the corresponding candidate SN to the MN even though the trigger condition indicated by measurement report trigger information is not fulfilled.

Consequently, not measurement results for all of the second set of candidate SNs can fulfil the trigger condition. That is, not all measurement reports of the second set of candidate SNs can be transmitted to MN. Therefore, the MN may receive measurement reports associated with a third set of candidate SNs from the UAV, wherein the third set of SNs is a subset of the second set of candidate SNs. Then, the MN may select at least one of the third set of candidate SNs as the SN for serving the UAV with the MN. The selection may be performed based on the measurement result included in the measurement reports.

At step 714, the at least one selected candidate SN may be added as the SN for serving the UAV through a SN addition procedure as shown in FIG. 2, or through other known SN addition procedures.

At step 716, for the candidate SNs of the second set of candidate SNs which are not selected as the SN, the MN may transmit an air beam cancellation indication to indicate the candidate SN to cancel the air beam prepared for the UAV. However, step 716 is an optional step, as stated above, the candidate SNs of the second set of candidate SNs which are not selected as the SN may have set the timer for keep the air beam, when the timer expires, these candidate SNs may cancel the prepared air beam without the air beam cancellation indication from the MN.

After adding the SN for serving the UAV, in step 718, the UAV and the SN may perform data transfer between each other.

Figure 8:
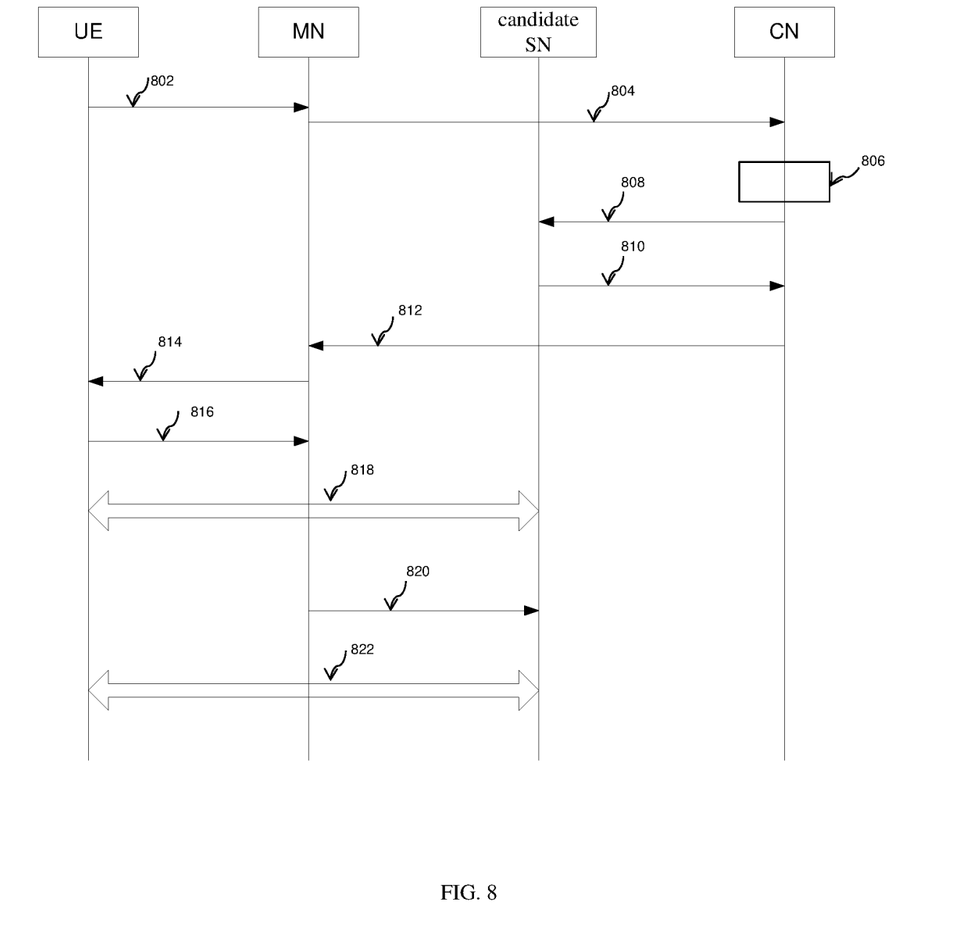
FIG. 8 is a flow chart illustrating a method for adding an SN for a UAV according to another embodiment of the present disclosure.

FIG. 8 is a flow chart illustrating a method for adding an SN for a UAV according to an embodiment of the present disclosure. The method illustrated in FIG. 8 may be used in the MR-DC scenario shown in FIG. 1.

As shown in FIG. 8, the step 802 may be the same as step 702 in FIG. 7. Different from FIG. 7, after receiving the location information and the flight path plan information of the UAV, the MN may transmit the location information together with the flight path plan information of the UAV to the CN to which the MN connect via a network interface such as S1 interface or NG interface.

After receiving the above information, at steps 806-810, the CN may perform the same operations as those performed in steps 704-708 in FIG. 7. That is, the operations in steps 806-810 are the same as those in steps 704-708 in FIG. 7. The main difference is that steps 704-708 in FIG. 7 are performed between the MN and a candidate SN, while the steps 806-810 in FIG. 8 are performed between the CN and a candidate SN.

Consequently, as step 810, the CN may receive the air beam preparation complete message from each of a second set of candidate SNs that has prepared the air beam for the UAV, wherein the second set of candidate SNs is a subset of the first set of candidate SNs.

Then, in step 812, the CN may transmit a list of the second set of candidate SNs that have prepared the air beam for the UAV to the MN such that the MN may measurement configuration information associated with the second set of candidate SNs to the UAV.

The operations in the following steps 814-822 in FIG. 8 are the same as those performed in steps 710-718 in FIG. 7, which have been described in detail in the preceding paragraphs.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for emotion recognition from speech as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. A base station, comprising:
at least one memory; and
at least one processor coupled with the at least one memory and configured to cause the base station to:
transmit an air beam preparation request for preparing an air beam for an unmanned aerial vehicle (UAV) serviced by a master node (MN) to a first set of candidate secondary nodes (SNs) with location information of the UAV, wherein each of the first set of candidate SNs is connected to the MN via a network interface and is secondary to the MN; and
receive:
the location information; and
an air beam preparation complete message from each of a second set of candidate SNs that has prepared the air beam for the UAV, wherein the second set of candidate SNs is a subset of the first set of candidate SNs.

2. The base station of claim 1, wherein the processor is further configured to cause the base station to:
receive flight path plan information of the UAV; and
transmit the flight path plan information of the UAV to the first set of candidate SNs.

3. The base station of claim 1, wherein causing the base station to transmit the air beam preparation request comprises:
causing the base station to transmit time range information regarding time to start the air beam and to cancel the air beam to the first set of candidate SNs.

4. The base station of claim 1, wherein causing the base station to transmit the air beam preparation request comprises:
causing the base station to transmit an air beam preparation indication to the first set of candidate SNs, the air beam preparation indication comprising at least one of:
an instruction to prepare the air beam or an instruction for the candidate SN to determine whether to prepare the air beam by itself at least based on the location information of the UAV.

5. The base station of claim 1, wherein the processor is further configured to cause the base station to trigger a timer for receiving the air beam preparation complete message.

6. The base station of claim 1, wherein the at least one processor is further configured to cause the base station to:
transmit measurement configuration information associated with the second set of candidate SNs to the UAV; and
receive measurement reports associated with a third set of candidate SNs from the UAV, wherein the third set of SNs is a subset of the second set of candidate SNs.

7. The base station of claim 6, wherein the measurement configuration information comprises timer information for transmitting the measurement reports from the UAV.

8. The base station of claim 6, wherein the at least one processor is further configured to cause the base station to:
select at least one of the third set of candidate SNs as the SN for serving the UAV with the MN.

9. The base station of claim 8, wherein the at least one processor is further configured to cause the base station to:
transmit an air beam cancellation indication to the candidate SNs of the second set of candidate SNs, which are not selected as the SN, to cancel the air beam prepared for the UAV.

10. The base station of claim 1, wherein the at least one processor is further configured to cause the base station to:
select the first set of candidate SNs from all nodes connected to the MN via the network interface at least based on the location information of the UAV.

11. A base station comprising:
at least one memory; and
at least one processor coupled with the at least one memory and configured to cause the base station to:
receive an air beam preparation request for preparing an air beam for an unmanned aerial vehicle (UAV) with location information of the UAV;
in response to the air beam preparation request:
prepare the air beam for the UAV; or
determine whether to prepare the air beam for the UAV at least based on the location information of the UAV; and
in response to the air beam for the UAV being prepared, transmit an air beam preparation complete message, the air beam preparation complete message indicating that the base station has prepared the air beam for the UAV.

12. The base station of claim 11, wherein receiving the air beam preparation request comprises the at least one processor causing the base station to receive flight path plan information of the UAV.

13. The base station of claim 11, wherein the at least one processor causing the base station to receive the air beam preparation request comprises causing the base station to receive time range information regarding time to start the air beam and to cancel the air beam.

14. The base station of claim 11, wherein the at least one processor causing the base station to receive the air beam preparation request comprises:
causing the base station to receive an air beam preparation indication, indicating:
preparing the air beam for the UAV; or
determining whether to prepare the air beam for the UAV at least based on the location information of the UAV.

15. The base station of claim 11, wherein the at least one processor is further configured to cause the base station to:
if the air beam is to be prepared in response to the air beam preparation request while another air beam has been prepared, determine whether the prepared air beam can be reused for the UAV.

16. The base station of claim 15, wherein the at least one processor is further configured to cause the base station to:
if the prepared air beam can be reused for the UAV, restart a timer for the prepared air beam based on the air beam preparation request.

17. The base station of claim 11, wherein the at least one processor is further configured to cause the base station to receive an air beam cancellation indication to cancel the air beam prepared for the UAV.

18. An apparatus for performing a network function, the apparatus comprising:
at least one memory; and
at least one processor coupled with the at least one memory and configured to cause the apparatus to:
transmit an air beam preparation request for preparing an air beam for an unmanned aerial vehicle (UAV) serviced by a master node (MN) to a first set of candidate secondary nodes (SNs) with location information of the UAV, wherein each of the first set of candidate SNs is connected to the MN via a network interface and is secondary to the MN; and receive:
   the location information; and
   an air beam preparation complete message from each of a second set of candidate SNs that has prepared the air beam for the UAV, wherein the second set of candidate SNs is a subset of the first set of candidate SNs.

19. The apparatus of claim 18, wherein:
causing the apparatus to receive the location information comprises causing the apparatus to receive the location information of the UAV from the MN; and
the at least one processor is further configured to cause the apparatus to transmit a list of the second set of candidate SNs that have prepared the air beam for the UAV to the MN.

* * * * *